United States Patent Office 2,990,119
Patented June 27, 1961

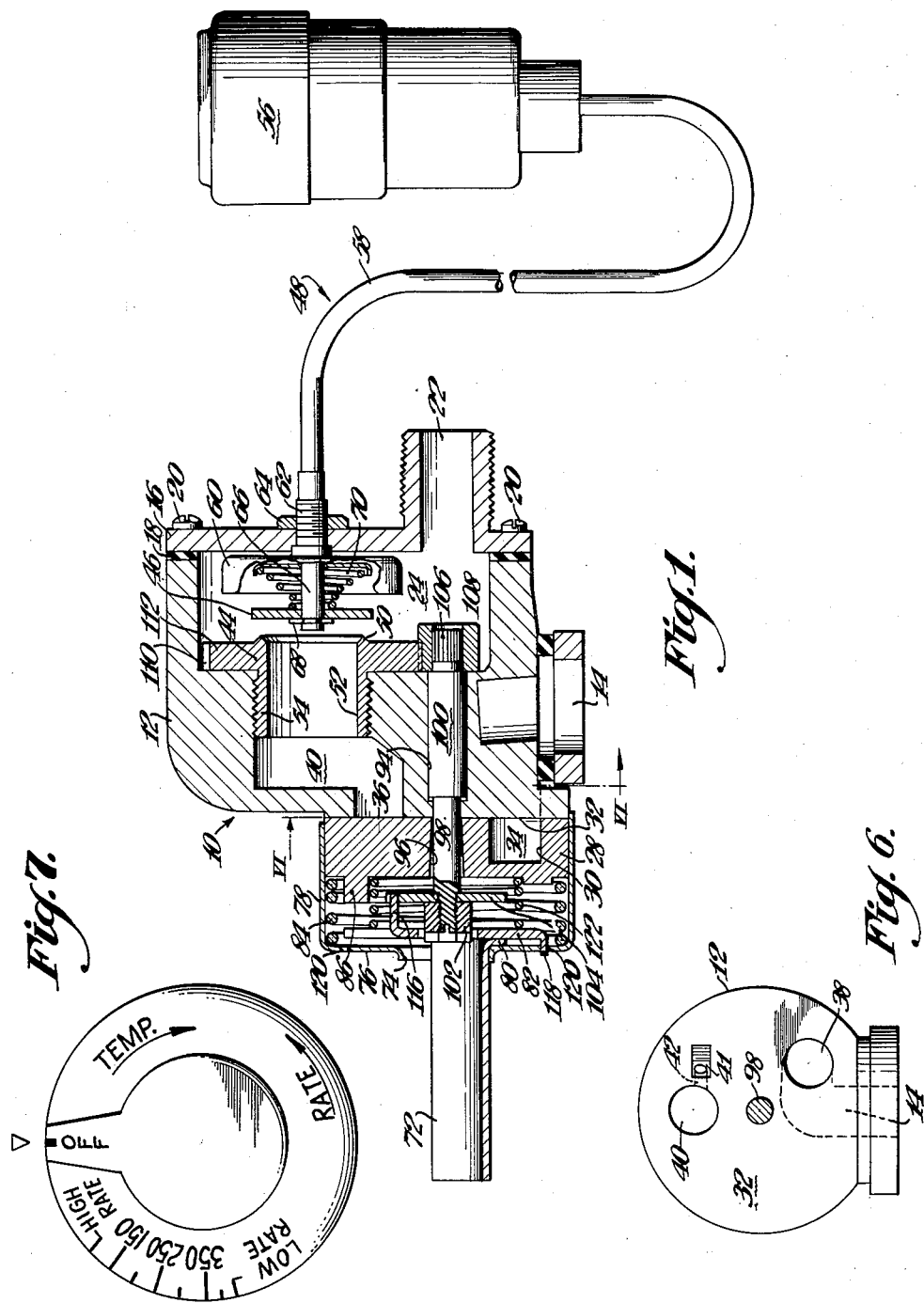

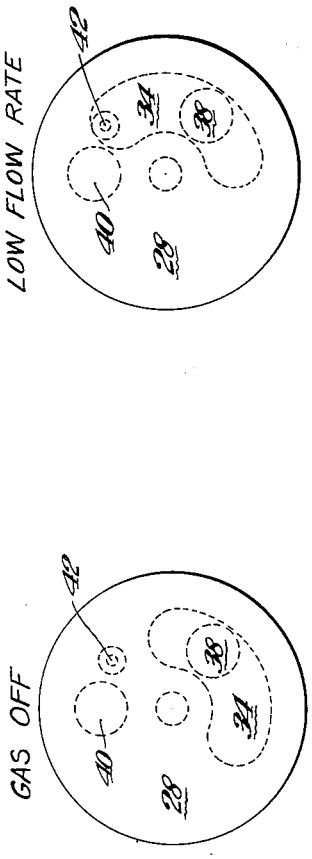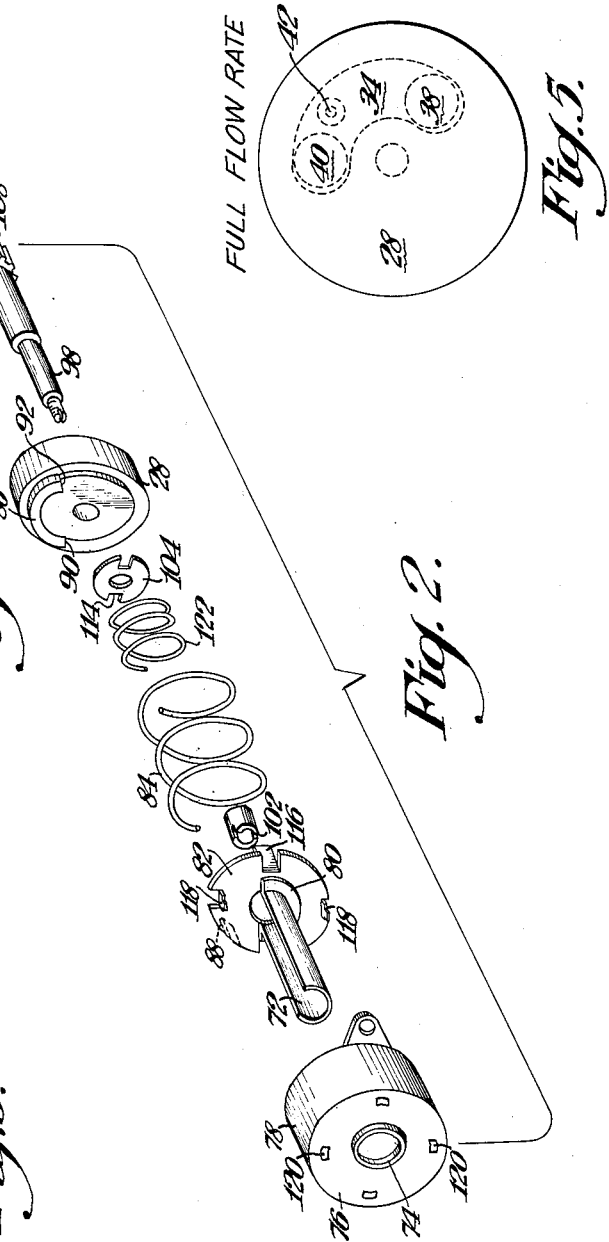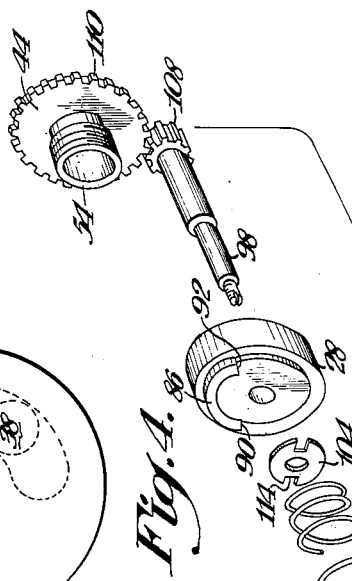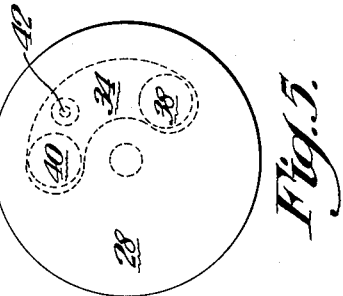

2,990,119
THERMOSTATIC CONTROL VALVE
James R. Willson, Greensburg, Pa., assignor to Robertshaw-Fulton Controls Company, Richmond, Va., a corporation of Delaware
Filed Apr. 1, 1959, Ser. No. 803,404
5 Claims. (Cl. 236—99)

This invention relates to thermostatic control valves and, more particularly, to control valves in which a thermostatic valve and a shut-off valve are actuated by a single dial shaft to control the flow of fluid fuel to a top burner of a gas range.

It is a principal object of this invention to combine into a unitary, economical and easily manufactured control valve, means whereby the control valve may be set to establish the desired maximum flame height and the desired temperature to be maintained by the fuel burner.

In a preferred embodiment of this invention, the control valve is provided with a casing formed with a flow passage in which thermostatically controlled valve means are arranged to regulate the flow in accordance with the temperature of a cooking vessel being heated by the burner. A rotary disc valve cooperates with a portion of the casing to selectively control the "on-off" flow. A single dial shaft operatively interconnects the rotary disc valve and the thermostatic valve means for the purpose of actuating the control valve between "on-off" positions and setting the temperature to be maintained.

Other objects and advantages of this invention will be apparent from the following description taken in connection with the accompanying drawings, wherein:

FIG. 1 is a longitudinal sectional view of a preferred embodiment of this invention;

FIG. 2 is an exploded perspective view on a reduced scale of some of the elements of the device shown in FIG. 1;

FIGS. 3, 4, and 5 are somewhat diagrammatic views illustrating various operating positions of a portion of the device shown in FIG. 1;

FIG. 6 is a detailed view of a portion of the device shown in FIG. 1; and

FIG. 7 is a front elevation of a control knob applicable to the device of FIG. 1.

Referring now more particularly to the drawings, a control valve, indicated generally by reference numeral 10 in FIG. 1, is provided with a casing 12 formed with an inlet 14. An end plate 16 and a sealing gasket 18 are connected to casing 12 by a plurality of screws 20. An outlet 22 is formed in end plate 16 and communicates with a chamber 24 formed between casing 12 and plate 16.

Disc valve means are provided for selectively controlling "on-off" flow from inlet 14 to outlet 22 and generally comprises a rotary disc 28 formed with an arcuate groove 30 which cooperates with a surface 32 of casing 12 to define an arcuate flow passage 34. Disc 38 is formed with a surface 36 which is positioned adjacent to surface 32 and is rotatable in contact therewith. Both surfaces 32 and 36 are preferably lapped to provide a smooth flat interface which, when lubricated lightly, forms a fluid seal to prevent the leakage of gas between disc 28 and casing 12.

As best seen in FIG. 6, a passage 38 is drilled in casing 12 and communicates with inlet 14. Another flow passage 40 is formed in casing 12 and extends from surface 32 into communication with chamber 24. Surface 32 is countersunk at an angle that is indicated by reference numeral 41 and a flow passage 42 is drilled to intersect with passage 40. Passage 42 is smaller in diameter than passage 40 and serves to restrict the flow rate through casing 12 to a lower value during a portion of the operation of control valve 10 as hereinafter described.

The angular displacements of passages 38, 40, and 42, as best seen in FIGS. 3, 4, or 5, are such that rotation of disc 28 allows passage 34 to provide selective communication between inlet 14 and passage 42 or passages 40 and 42. In an "on" condition, as viewed in FIG. 5, gas will flow serially from inlet 14 through passages 38, 34, 40, and 42, and chamber 24 to outlet 22.

Thermostatically controlled valve means are provided for regulating and controlling the flow of fluid through casing 12 and generally comprise a valve seat member 44, a valve member 46, and a temperature responsive means indicated generally (FIG. 1) by numeral 48. Valve seat member 44 is formed with an annular V-shaped valve seat 50, an axial bore 52 through which passage 40 extends, and a threaded hub 54 which cooperates with casing 12 to cause valve seat 50 to move axially upon rotation of valve seat member 44.

Temperature responsive means 48 comprises a temperature sensing element connected by a capillary tube 58 to an expansible chamber 60. Expansible chamber 60 and capillary tube 58 are connected to end plate 16 by a threaded connector 62 and a nut 64. The inner movable wall of chamber 60 has an actuating pin 66 connected thereto for movement upon expansion and contraction of chamber 60. A C-shaped washer 68 is clamped into a groove formed at the other end of pin 66 and serves as an abutment against which valve member 46 is biased by a spring 70. Temperature responsive means 48 forms a closed system which is preferably filled with a conventional temperature sensitive fluid for causing expansion and contraction of chamber 60 in response to temperature variations of sensing element 56. It should be noted that the position of valve member 46 is directly proportional to the temperature sensing element 56 and that the temperature at which passage 40 is closed is dependent upon the position of valve seat 50. By rotating valve seat member 44, this position, hence the "temperature," can be changed.

A rotatable dial shaft 72 extends through a bearing opening 74 formed in end wall 76 of a cup-shaped cap 78 which is connected to casing 12 by screw means (not shown). Shaft 72 is somewhat tubular and has a C-shaped cross-section shank adapted to be connected at one end to a conventional control knob as shown in FIG. 7. The other end of shaft 72 is provided with a radially extending flange 80 that is welded to a driving member in the form of an annular plate 82. A helical compression spring 84 extends between wall 76 and disc 28 for biasing the same into rotatable seating engagement with casing 12. The axis of shaft 72 is positioned in substantial alignment with outlet 22 for permitting control valve 10 to be installed in many conventional gas ranges.

Disc 28 is formed with an arcuate abutment 86 by means of which motion is transmitted to the disc. A tang 88 extends axially from plate 82 towards disc 28 and forms a lost-motion connection between dial shaft 72 and disc 28. Sufficient rotation of shaft 72 causes tang 88 to engage end 90 or end 92 (FIG. 2) of abutment 86 and thereby transmit rotation from shaft 72 to disc 28.

Casing 12 is formed with a bore 94 in substantial alignment with a tapered bore 96 formed in disc 28. A rotatable shaft 98 is disposed within bores 96 and 94 and has a journal 100 machined to substantially the same diameter as bore 94 to prevent gas from leaking from chamber 24 and through bore 94. A nut 102 is screwed onto the other end of shaft 98 and holds a drive plate 104 in engagement with a shoulder section of shaft 98 for rotation therewith. The other end of shaft 98 has a splined portion 106 on which a pinion gear 108 is mounted for rotation therewith. Pinion 108 engages the teeth of a spur gear 110 formed on the outer periphery of a flange 112 which is integral with valve seat member 44.

Drive plate 104 is formed with a plurality of peripheral grooves 114 into which a plurality of cooperating tangs 116 projecting from plate 82 extend. It will be apparent that rotation of shaft 72 causes tangs 116 to rotate drive plate 104 and shaft 98. Such rotation causes pinion 108 to rotate spur gear 110 whereupon valve seat member 44 moves axially. Axial movement of plate 82 merely results in tangs 116 sliding within grooves 114 and does not cause any movement of plate 104. It should be noted that the location of tangs 116 differs in FIGS. 1 and 2. The location in FIG. 1 is merely to more clearly illustrate the association of tangs 116 with plate 104 and in the preferred embodiment of the invention, the tangs 116 are located as shown in FIG. 2.

To prevent shaft 72 from being accidentally rotated from an "off" position, plate 82 is provided with a plurality of latch tangs 118 which cooperate in the "off" position with the walls of a plurality of detent apertures 120 formed in wall 76. A helical spring 122 extends between disc 28 and plate 82 and biases plate 82 outwardly towards engagement with wall 76. The tangs 118 and holes 120 are so positioned to prevent rotation only when shaft 72 is in the "off" position.

The respective positions of rotary disc valve means 28 shown in FIGS. 3, 4, and 5, are "off," "low flow," and "full flow" positions. As shown in FIG. 1, control valve 10 is in the "off" position. In operation, inlet 14 is connected to a source of fuel supply and outlet 22 is connected to a top burner unit of a gas range. The sensing element 56 is disposed within the center of the burner and is adapted to engage a pan or cooking vessel placed on the burner and be responsive to the temperature thereof.

To turn control valve 10 on, it is necessary to depress shaft 72 against the bias of spring 122 and rotate slightly until tangs 118 are no longer in alignment with holes 120 whereupon the depressing force may be released and only a rotative force need be applied to shaft 72. In the "off" position, tang 88 engages end 90 of abutment 86. It is necessary to rotate shaft 72 through the lost-motion connection until tang 88 engages end 92 whereupon further rotation causes passage 34 to move into communication with only passage 42 for low flow rate, as shown in FIG. 4, or with both passages 40 and 42 for full flow rate, as shown in FIG. 5. In both of these positions, gas is admitted to casing 12 and the flow is regulated by the thermostatically controlled valve means. To set the temperature at which the cooking vessel is to be maintained, the dial shaft 72 is rotated in the reverse direction until the angular position is obtained corresponding to the desired temperature.

It should be understood that the initial setting establishes the maximum flame height during operation. As the temperature of sensing element 56 increases, chamber 60 expands and causes actuating pin 66 and valve member 46 to move towards engagement with valve seat 50 and thereby reduce the flow and the flame height. At the desired temperature, valve member 46 engages valve seat 50 to shut off the flow through passage 40. To prevent the burner from going completely out, a bypass passage (not shown) may be formed in casing 12 between passage 40 and chamber 24 to maintain a minimum flow rate. Any further increases in temperature above this initially closed temperature cause valve member 46 to disengage washer 68 and move against the bias of spring 70. This action provides an overrun mechanism to prevent damage caused by excessive temperatures.

To prevent leakage in the closed position between valve member 46 and pin 66, a suitably formed sealing washer (not shown) may be provided. Subsequent decreases in temperature cause the reverse action and allow the flow rate to increase until the desired temperature is again reached. To shut off control valve 10, shaft 72 is rotated clockwise, as viewed in FIG. 2, until tang 88 engages end 90. Further rotation causes passage 34 to move from communication with passages 40 and 42 to shut off the flow. Shaft 72 is then rotated still further until tangs 118 fall into holes 120.

It will be obvious that the temperature setting is proportional to the angular position of shaft 72. With the control knob attached thereto, the indicia customarily formed thereon may be improperly aligned with an index so that the angular position does not correspond to the temperature being maintained. To correct this, adjustment means are provided to allow proper alignment between the angular position and the true temperature. This may be done by loosening nut 102 and rotating shaft 98 to cause valve seat member 44 to move to the position corresponding to the desired temperature setting. Then, nut 102 is retightened. It may be necessary to repeat this process until the proper orientation is achieved.

It will be apparent that many changes and modifications may be made in the disclosed structure without departing from the scope of the invention as defined in the appended claims.

I claim:

1. A fuel flow control device comprising in combination, a control casing having inlet and outlet passages for fuel intersected by a valve seat, a rotatable disc valve member having a seating surface on one face thereof cooperable with said valve seat, said disc valve member being provided with a flow passage movable therewith between open and closed positions relative to said passages, regulating valve means movable in said casing for regulating fuel flow through said passages, thermally responsive means operable for moving said regulating valve means, rotatable means operably connected for adjusting said regulating valve means for movement at a predetermined temperature sensed by said thermally responsive means, and a driving member for said rotatable means extending substantially parallel with the opposite face of said disc valve member and coaxial therewith, said driving and disc valve members having cooperating tang and abutment elements forming a lost motion connection therebetween, said elements being operatively engageable upon rotation of said driving member in one direction for moving said disc valve member to said open position, said lost motion connection being effective upon rotation of said driving member in a reverse direction for adjusting said regulating valve means.

2. A fuel flow control device comprising in combination, a control casing having inlet and outlet passages for fuel intersected by a valve seat, a rotatable disc valve member having a seating surface on one face thereof cooperable with said valve seat, said disc valve member being provided with a flow passage movable therewith between open and closed positions relative to said passages, regulating valve means movable in said casing for regulating fuel flow through said passages, thermally responsive means operable for moving said regulating valve means, stem means mounted for rotation relative to said disc valve member and being operably connected for adjusting said regulating valve means for movement at a predetermined temperature sensed by said thermally responsive means, and a driving member operably connected for rotating said stem means and extending substantially parallel with the opposite face of said disc valve member and coaxial therewith, said driving and disc valve members having cooperating tang and abutment elements forming a lost motion connection therebetween, said elements being operatively engageable upon rotation of said driving member in one direction for moving said disc valve member to said open position, said lost motion connection being effective upon rotation of said driving member in a reverse direction for adjusting said regulating valve means.

3. A fuel flow control device comprising in combination, a control casing having inlet and outlet passages for fuel intersected by a valve seat, a rotatable disc valve member having a seating surface on one face thereof cooperable with said valve seat, said disc valve member being provided with a flow passage movable therewith between open and closed positions relative to said passages, regulating valve means movable in said casing for regulating fuel flow through said passages, thermally responsive means operable for moving said regulating valve means, stem means mounted for rotation relative to said disc valve member and being operably connected for adjusting said regulating valve means for movement at a predetermined temperature sensed by said thermally responsive means, drive means secured to said stem for imparting rotation thereto, and a driving member operably engageable with said drive means and extending substantially parallel with the opposite face of said disc valve member and coaxial therewith, said driving and disc valve members having cooperating tang and abutment elements forming a lost motion connection therebetween, said elements being operatively engageable upon rotation of said driving member in one direction for moving said disc valve member to said open position, said lost motion connection being effective upon rotation of said driving member in a reverse direction for adjusting said regulating valve means.

4. A fuel flow control device comprising in combination, a control casing having inlet and outlet passages for fuel intersected by a valve seat, a rotatable disc valve member having a seating surface on one face thereof cooperable with said valve seat, said disc valve member being provided with a flow passage movable therewith between open and closed positions relative to said passages, an adjustable valve seat in said casing, a regulating valve member cooperable with said adjustable valve seat for regulating fuel flow through said passages, thermally responsive means operable for moving said regulating valve member, stem means mounted for rotation relative to said disc valve member and being operably connected for adjusting said adjustable valve seat relative to said regulating valve member for cooperation therewith at a predetermined temperature sensed by said thermally responsive means, drive means secured to said stem for imparting rotation thereto, and a driving member operably engageable with said drive means and extending substantially parallel with the opposite face of said disc valve member and coaxial therewith, said driving and disc valve members having co-operating tang and abutment elements forming a lost motion connection therebetween, said elements being operatively engageable upon rotation of said driving member in one direction for moving said disc valve member to said open position, said lost motion connection being effective upon rotation of said driving member in a reverse direction for adjusting said adjustable valve seat.

5. A fuel flow control device comprising in combination, a control casing having inlet and outlet passages for fuel intersected by a valve seat, a rotatable disc valve member having a seating surface on one face thereof cooperable with said valve seat, said disc valve member being provided with a flow passage movable therewith between open and closed positions relative to said passages, an annular valve seat threadedly connected to said casing for axial movement, a regulating valve member cooperable with said annular valve seat for regulating fuel flow through said passages, thermally responsive means operable for moving said regulating valve member, a valve stem rotatable relative to said disc valve member on an axis substantially parallel with said annular valve seat, detent means operable between said stem and said annular valve seat for adjusting said annular valve seat relative to said regulating valve member for cooperation therewith at a predetermined temperature sensed by said thermally responsive means, drive means secured to said stem for imparting rotation thereto, and a driving member operably engageable with said drive means and extending substantially parallel with the opposite face of said disc valve member and coaxial therewith, said driving and disc valve members having cooperating tang and abutment elements forming a lost motion connection therebetween, said elements being operatively engageable upon rotation of said driving member in one direction for moving said disc valve member to said open position, said lost motion connection being effective upon rotation of said driving member in a reverse direction for adjusting said annular valve seat.

References Cited in the file of this patent
UNITED STATES PATENTS

| | | |
|---|---|---|
| 1,058,171 | Froehlich | Apr. 8, 1913 |
| 1,977,552 | Grayson et al. | Oct. 16, 1934 |
| 2,099,171 | Matthews et al. | Nov. 16, 1937 |
| 2,153,886 | Grayson | Apr. 11, 1939 |
| 2,746,686 | Loveland et al. | May 22, 1956 |